United States Patent
Tanabe et al.

[19]

[11] Patent Number: 6,109,759
[45] Date of Patent: Aug. 29, 2000

[54] OPTICAL BEAM AXIS ADJUSTMENT APPARATUS OF HEAD LAMP FOR USE IN VEHICLE

[75] Inventors: Toru Tanabe; Hideki Kitamura, both of Yokohama; Hirokazu Seki, Tokyo, all of Japan

[73] Assignee: Stanley Electric Co., Ltd., Tokyo, Japan

[21] Appl. No.: 09/145,462

[22] Filed: Sep. 2, 1998

[30] Foreign Application Priority Data

Oct. 2, 1997 [JP] Japan ................................. 9-269885

[51] Int. Cl.$^7$ ........................................ B60Q 1/12
[52] U.S. Cl. ........................ 362/42; 362/464; 362/465; 362/466; 362/467; 362/276
[58] Field of Search ............................ 362/37, 42, 464, 362/465, 466, 467, 276, 802

[56] References Cited

U.S. PATENT DOCUMENTS 5,684,698  11/1997  Fujii et al. ............................. 364/424
5,787,370  7/1998  Kutscher et al. ......................... 701/49

*Primary Examiner*—Sandra O'Shea
*Assistant Examiner*—John A. Ward
*Attorney, Agent, or Firm*—James Creighton Wray; Meera P. Narasimhan

[57] ABSTRACT

An object of the present invention is to enable to adequately adjust an optical beam axis of a lamp in response to an inclining angle of a main body of a vehicle in a back and forth direction in an optical beam axis adjustment apparatus of a head lamp for use in vehicle.

Upward and downward movements of front and rear wheels are individually sensed by use of respective stroke sensors 1 and 2. An angular detecting unit 3a detects the inclining angle of the main body of the vehicle in the back and forth direction depending upon the output signals produced from the stroke sensors while a traveling sensing unit 3b senses a traveling status and a stopping status of the vehicle. A control unit 3 adjusts the optical beam axis of the head lamp 5 through an actuator 4 during stopping of the vehicle, corresponding to the detected angular data produced from the stroke sensors 1 and 2; and averaged during a certain specified period which precedes the adjustment.

5 Claims, 4 Drawing Sheets

OPTICAL BEAM AXIS ADJUSTMENT APPARATUS OF HEAD LAMP FOR USE IN VEHICLE

BACKGROUND OF THE INVENTION

1. Field of the Invention

The present invention relates to an optical beam axis adjustment apparatus for automatedly adjusting a vertical angle of an optical beam of a head lamp for use in vehicle.

2. Brief Description of the Prior Art

A main body of a vehicle, in particular of an automobile car, is apt to incline upwardly and downwardly with respect to a horizontal plane in a back and forth direction, depending upon a number of riding passengers and a loading status of luggage. The term "main body of a vehicle" is defined herein as a "main body of a vehicle including a carrosserie and a chassis no matter what a formed status may be monocoque or separate". The term "back and forth direction" is simultaneously defined herein as a "direction similar to those toward which a ship, an airplane etc. incline their bodies when they are pitching". During the inclination, an orienting direction of a head lamp varies corresponding to an angle at which a bottom surface of the main body intersects the horizontal plane. As a result, it has so far been proposed to adjust vertically an optical beam axis of the head lamp corresponding to an inclining angle of the main body in the back and forth direction.

FIG. 5 is a side view showing a schematic constitution of such a sort of mechanisms as automatedly adjusting the optical beam axis of the head lamp. In FIG. 5, stroke sensors 1 and 2 are provided which are connected through a suspension arm and a link, respectively, to a front wheel and a rear wheel. An upward and downward movement of each wheel is transformed into each rotation angle of the stroke sensors 1 and 2. Output voltages produced corresponding to aforesaid rotation angles are applied to an electric control unit (referred to as "ECU") 3.

The control unit 3 calculates the inclination angle of the main body in the back and forth direction from applied input data for measuring the upward and downward movements of the front and the rear wheels as well as from a distance between two axles, namely a wheelbase. Herein the inclination angle θ of the main body is represented by a following equation:

$$\theta \tan -1(\Delta h/L) \quad (1)$$

wherein Δh is a difference in height between the front wheel and the rear wheel while L is the distance between the two axles.

An electric signal produced from the ECU 3 moves either upwardly or downwardly the optical beam axis of the head lamp through an actuator 4 toward a reverse direction with respect to that the main body inclines as far as aforesaid difference in inclination angle θ from an initial position of the main body which is calculated by Equation (1) around a lamp supporting portion as a supporting point.

Because aforesaid adjustment in optical beam axis of the lamp is performed only to an extent of the weight variation in main body which is induced by changes in numbers of the passengers and the luggage, the adjustment is carried out with respect to the inclining angle of the main body during a standstill of the vehicle.

However, the conventional optical beam adjustment apparatuses mentioned above have some problems that the adequate optical beam axis adjustment cannot be performed, depending upon the various statuses of the vehicles and traffic roads.

For instance, when a judgment whether the vehicle is now traveling or stopping is passed by reading sensing pulses for sensing a car speed before computing the inclining angle of the main body during stopping, the sensing pulses for sensing the car speed are frequently delayed to be applying to an input terminal. If the main body changes in attitude during starting before the input pulses for sensing the car speed are applied, the optical beam axis adjustment cannot be performed when the car speed pulses are applied later even though the attitude of the main body has changed from the attitude during the standstill.

On the other hand, if the optical beam axis is subjected to the adjustment every time when the vehicle stops, the adequate lamp angle cannot be obtained because the optical beam axis varies due to road situations such as a slope of a road or waviness of the road surface even though there exists no variation in load of the vehicle.

If the car speed sensing pulses are not applied because a failure mode takes place, for instance, in the car speed sensor, the optical beam axis adjustment operates even during the traveling of the vehicle, which is inconvenient to the system on the contrary.

Furthermore, a positioning adjustment is necessary during equipping the stroke sensors for use in detecting the inclination angle of the main body because a precision in positioning for equipping the stroke sensors is required. However, the positioning adjustment during equipping the stroke sensors is too difficult to attain a suitable lamp angle.

SUMMARY OF THE INVENTION

The present invention is carried out to solve the problems mentioned above. An object of the present invention is to provide an optical beam axis adjustment apparatus of a head lamp for use in vehicle which can always adjust adequately the optical beam axis of the lamp; and wherein a positioning adjustment during equipping a sensor for detecting an inclining angle of a main body of the vehicle can easily be performed.

To satisfy the purposes mentioned above, an optical beam axis adjustment apparatus of a head lamp for use in vehicle according to the present invention is constituted as follows:

(1) It comprises:
  stroke sensors for sensing upward and downward movements of a front wheel and a rear wheel of a vehicle;
  angular detecting means for detecting an inclination angle of a main body of the vehicle in a back and forth direction in response to sensed signals produced from aforesaid stroke sensors and to a distance between two axles; and
  an actuator for varying the optical beam axis of the head lamp upwardly and downwardly corresponding to aforesaid detected angular data, wherein:
  the optical beam axis of the head lamp is adjusted during stopping of the vehicle, depending upon average angular detecting data obtained by averaging the sensed signals which are produced from aforesaid stroke sensors during a certain period prior to the optical beam axis adjustment.

(2) The apparatus according to (1) is further constituted as follows:
  The optical beam axis is to be readjusted if the inclination angle of the main body changes beyond a certain specified value during the standstill of the vehicle.

(3) The apparatuses according to (1) and (2) are further constituted as follows:
  They have a traveling sensing unit for sensing a traveling status and a stopping status of the vehicle in response to the sensed signals produced from the stroke sensors.

(4) The apparatuses according to (3) are further constituted as follows:

The traveling sensing unit is controlled so as to sense the traveling status, depending upon parameters such as amplitudes, phases and frequencies of output signals produced from the stroke sensors connected respectively to the front and the rear wheels.

(5) The apparatuses according to (3) and (4) are further constituted as follows:

A sensing anomaly in car speed signal is to be notified if the applied car speed signal does not coincide with the sensing signal produced from the traveling sensing unit.

(6) The apparatuses according to (1) to (5) are further constituted as follows:

They have memory media for recording adjustment data including the sensing signals produced from the stroke sensors during adjusting the optical beam axis.

DETAILED DESCRIPTION OF THE PREFERRED EMBODIMENTS

Hereinafter described are the preferred embodiments according to the present invention with reference to the drawings from FIGS. 1 to 5. The best mode contemplated during carrying out the present invention into practice will be also described corresponding to the preferred embodiments.

Figure 1:
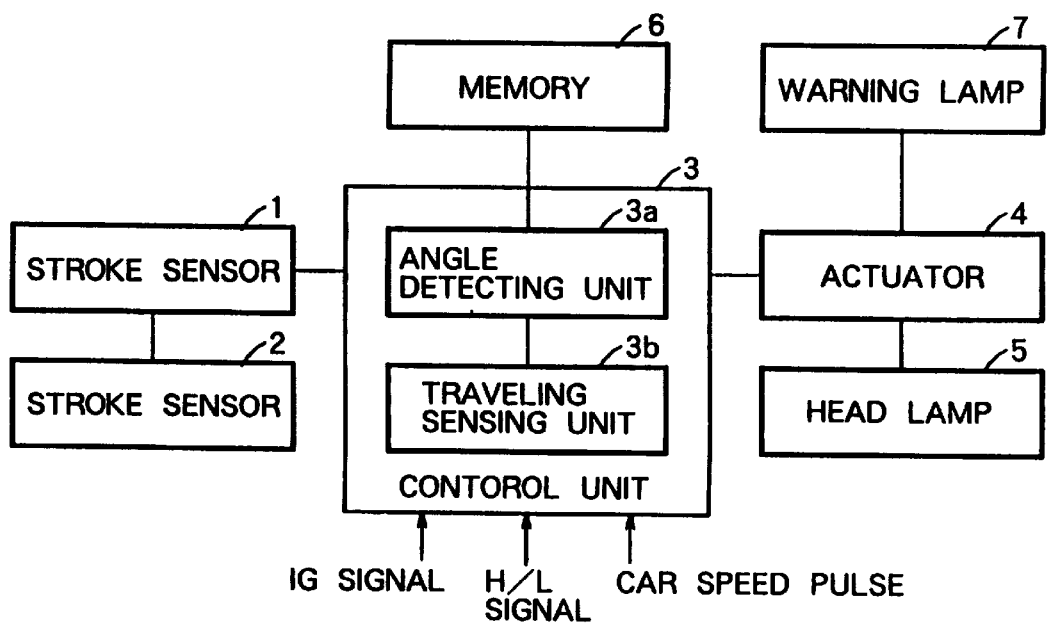
FIG. 1 is a block diagram showing constitutions of an embodiment according to the present invention.

FIG. 1 is a block diagram showing constitutions of an embodiment according to the present invention. In FIG. 1, numerical characters 1 and 2 stand for stroke sensors for sensing upward and downward displacements of a front wheel and a rear wheel which are shown respectively in FIG. 5. Another numerical character 3 stands for a control unit for processing sensed signals produced from those stroke sensors 1 and 2 to apply a control signal for controlling a head lamp 5 to an actuator 4. The control unit 3 includes an angle detecting unit 3a for detecting an inclination angle of a main body in a back and forth direction, corresponding to the sensed signals produced from the stroke sensors 1 and 2 as well as to a distance between two axles; and also includes a traveling sensing unit 3b for sensing a traveling status and a stopping status of a vehicle, depending upon the sensed signals produced from the stroke sensors 1 and 2.

Further in FIG. 1, 6 stands for writable memory media for recording adjustment data including the sensed signals produced from the stroke sensors 1 and 2 during adjustment of the optical beam axis of the head lamp 5 while 7 stands for a warning lamp (a pilot lamp) for lighting when the actuator 4 adjusts the optical beam axis of the head lamp 5.

Beside those, an IG signal for exhibiting an operational status of an ignition switch, a H/L signal transferred from a H/L switch (a passing lamp switch) and car speed pulses produced from a car speed sensor are applied to the control unit 3, wherein a sensing anomaly in car speed sensor is to be informed when the applied car speed pulses do not coincide with the sensed signals of the traveling sensing unit 3b. The traveling sensing unit 3b is constituted to sense the traveling status of the vehicle, depending upon parameters of an amplitude, a phase and a frequency in output signals produced from the stroke sensors 1 and 2.

In the optical beam axis adjustment apparatus constituted mentioned above, no optical beam axis adjustment is performed during traveling of the vehicle while the optical beam axis adjustment of the head lamp 5 is carried out automatedly during stopping of the vehicle corresponding to the detected angle data calculated from the sensed signals, which are produced from stroke sensors 1 and 2 and averaged for a certain specified period before the adjustment. When the inclination angle of the main body varies beyond a certain specified value during stopping of the vehicle, the system is constituted so as to readjust the optical beam axis of the head lamp 5.

Figure 2:
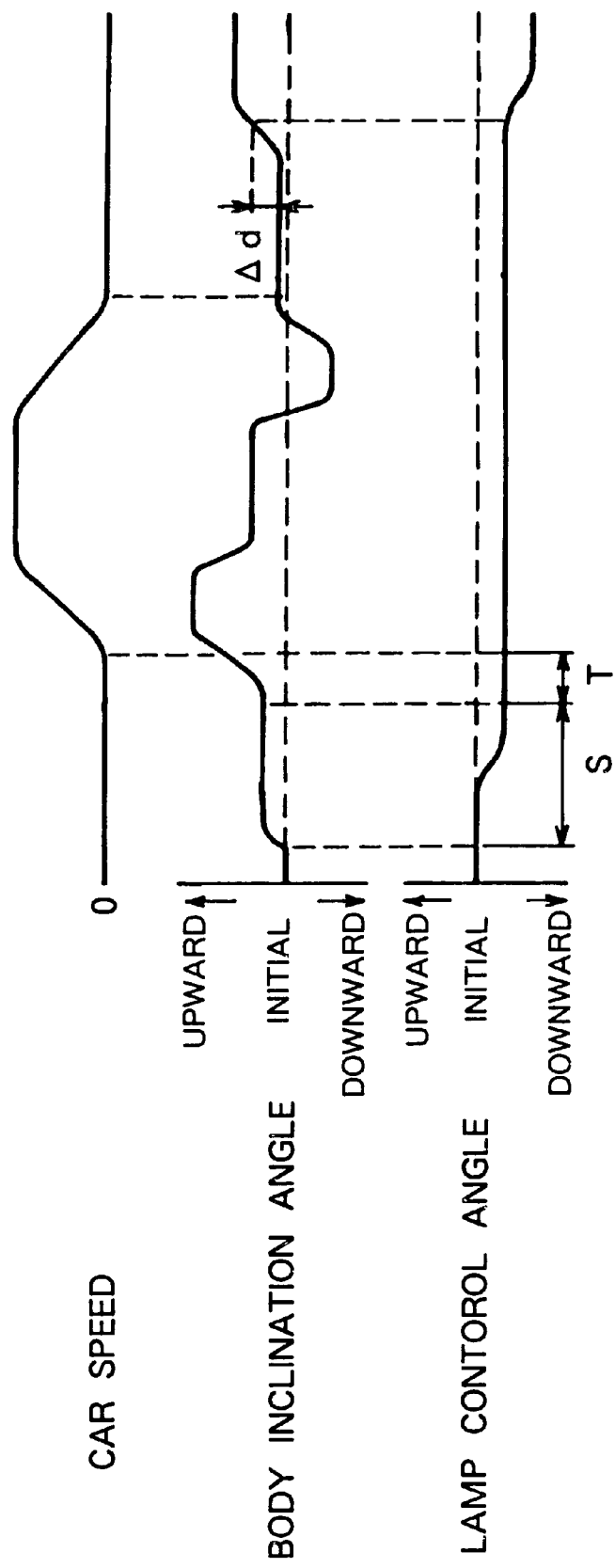
FIG. 2 is a view for illustrating control operations of a control unit according to the present invention.

FIG. 2 is a view for illustrating control operations of aforesaid control unit 3. During adjusting the optical beam axis of the lamp, the inclining angle θ of the main body which are calculated from the output signals produced from the stroke sensors 1 and 2 respectively for the front wheel and the rear wheel utilizing Equation (1) are averaged first for a period of S seconds (referred to as "sec") preceding the adjustment for another period of T sec. Then, the averaged value in inclination angle θ of the main body is transmitted to the actuator 4 as control data for controlling the lamp angle to adjust the optical beam axis of the head lamp 5.

The constitutions mentioned above maintain the inclination angle of the main body as it is at stopping of the vehicle even if a body posture (body inclination angle) changes before the car speed pulses are applied. The periods S and T shown in FIG. 2 may be decided depending upon mechanical characteristics of a suspension structure that the vehicle possesses.

When the vehicle stops after traveling, the optical beam axis of the head lamp 5 is then controlled by an average value which is averaged over the inclination angles during traveling and during stopping, respectively, if a change in inclination angle of the main body during stopping exceeds Δd which is the inclination angle prior to the stopping. If the main body is herein inclined just at stopping of the vehicle, the adjustment of the optical beam axis of the head lamp 5 is controlled corresponding directly to a thereinafter variation in load balance, for instance, newly riding passengers without averaging.

Figure 3:
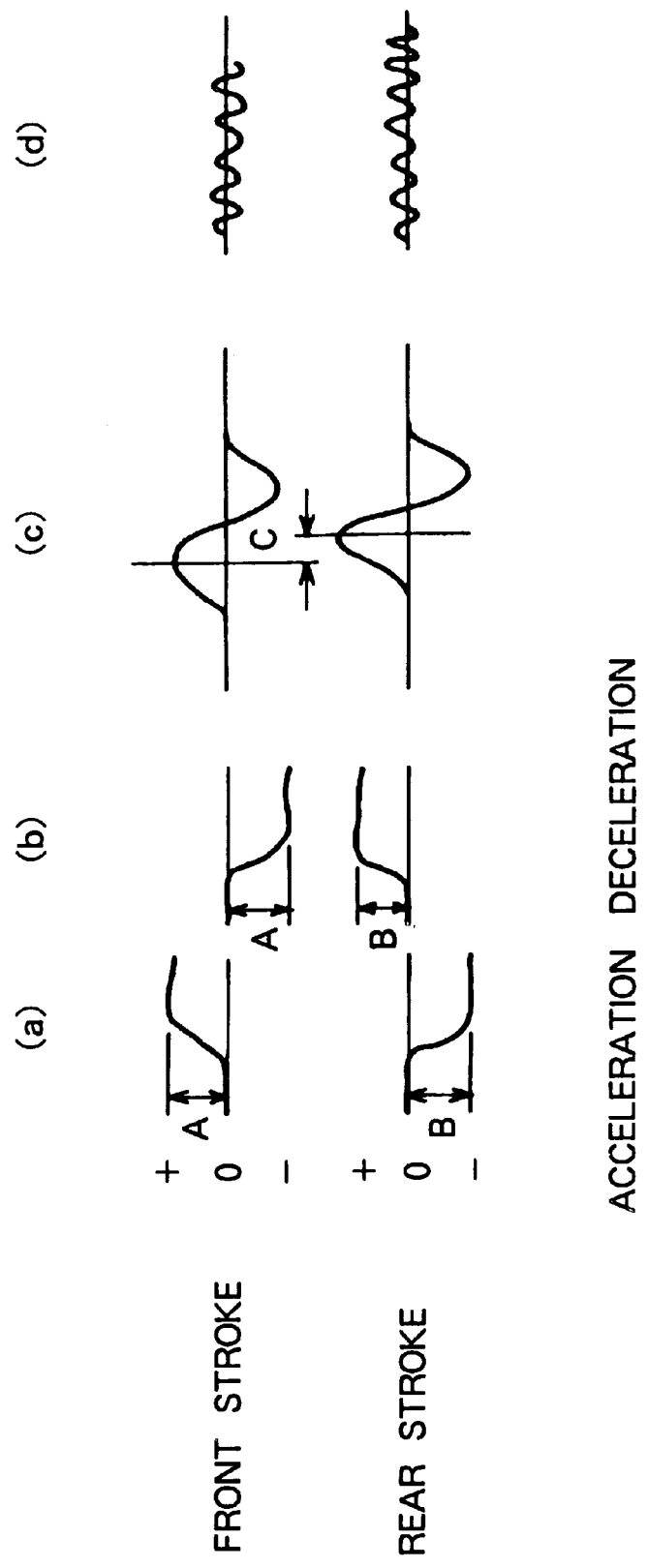
FIG. 3 is a view for illustrating sensing principles of a traveling sensing unit according to the present invention.

Next, principles for sensing the traveling of the vehicle will be described. The traveling sensing unit 3b shown in FIG. 1 distinguishes the traveling status from the stopping status of the vehicle, depending upon the signal outputs for sensing produced respectively from the stroke sensors 1 and 2 connected to the front wheel and the rear wheel of the vehicle. FIG. 3 shows four actual examples of sensing output patterns produced from the front and the rear strokes.

As shown in FIG. 3(a), if a variation A in sensing output produced from the front stroke sensor 1 is larger than null while another variation B in sensing output produced from the rear stroke sensor 2 is less than null respectively; and absolute values of A and B are approximately equivalent (an extent of coincidence in absolute values of A and B is specified depending upon the mechanical characteristics of the vehicle), the control unit 3 passes a judgment that the vehicle stays now at an accelerating status. Similarly as shown in FIG. 3(b), if A is less than null while B is larger than null and the absolute values of A and B are about similar, the control unit 3 judges that the vehicle stays now at a decelerating status. Both of the accelerating and decelerating statuses mean, of coarse, that the vehicle is now traveling.

On the contrary, if the variations in output signals produced from the front and rear stroke sensors 1 and 2 are periodical; and a phase of the variation in sensed signal produced from the rear stroke sensor 2 delays about to an extent of C (a value of C is dependent upon a wheelbase and the car speed) compared with that produced from the front stroke sensor 1 as shown in FIG. 3(c), the system also passes the judgment that the vehicle stays at the traveling status. Further, as shown in FIG. 3(d), if both variations in output signals produced from the front and rear stroke sensors 1 and 2 are periodical; and their frequencies and amplitudes exceed respectively certain values (the certain values are specified dependently upon the characteristics of the vehicle), the present status of the vehicle can also be judged as traveling.

If aforesaid car speed pulses are not applied to the control unit 3 even when the control unit 3 passes the judgment that the vehicle stays at the traveling status because the sensed signals satisfy any of the conditions shown respectively in FIGS.3(a), 3(b), 3(c) and 3(d), the control unit 3 judges that the car speed sensor falls into a failure mode etc., which terminates the control operation of the ECU 3 for controlling the optical beam axis of the lamp until a power supply is cut off.

Figure 4:
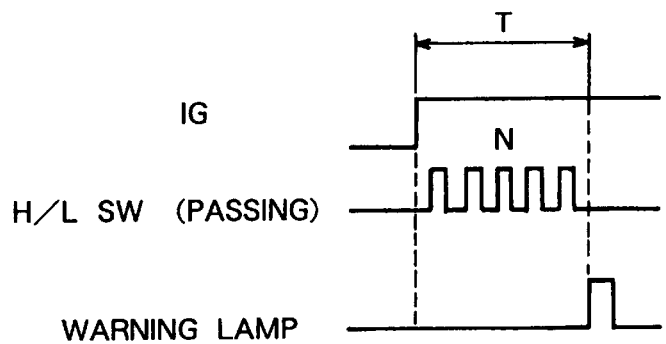
FIG. 4 is a view for illustrating a timing chart for calibrating sensors.
Figure 5:
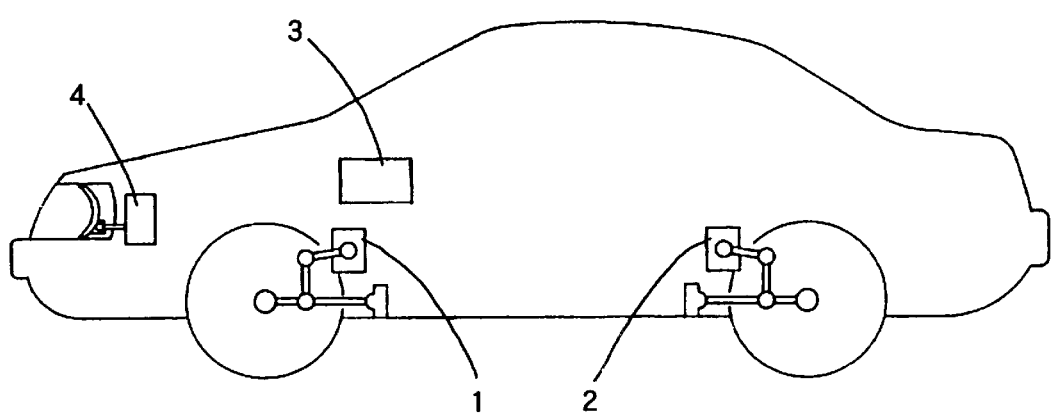
FIG. 5 is a schematic diagram showing an outline of an optical beam axis adjustment system.

On the other hand, the output signal produced from the stroke sensors 1 and 2 during a lamp aiming operation (the lamp aiming means an initial adjustment in luminous intensity distribution of the head lamp performed in general just after being mounted on the main body of the vehicle) is recorded on the memory 6 as initial values, which are then employable for calibrating signal errors of the stroke sensors associated with the installing step of the stroke sensors in the main body. A timing chart for calibrating the sensors is shown in FIG. 4.

For instance, ON/OFF operations of the passing light switch repeated manually more than N times (for instance, 5 times) in an elapsing time of T sec (for instance, 10 sec) since turning on of the ignition switch renders the control unit 3 carry out the sensor calibration and simultaneously renders the warning lamp 7 light on for a certain period to confirm that the sensor calibration is carried out assuredly.

Otherwise, it may preferably be constituted that a reset switch unshown in the drawings is additionally equipped in a drivers' box, wherein putting on of the reset switch continuously, for instance, for 2 sec after turning on of the ignition switch may carry out the sensor calibration.

Incidentally, the aforesaid sensor output signals are recorded on the memory 6 which is attached to the control unit 3, wherein the recorded data are stored even when the supply power is cut off.

Because the lamp control angle is obtained from the average sensed data which are averaged during the certain period preceding for the certain time before the optical beam adjustment of the vehicle according to the present invention, the inclination angle of the main body during stopping is employable as the lamp control angle, which enables always to compensate adequately the optical beam axis of the lamp even when the judgment passed on the status whether the vehicle is traveling or stopping is delayed due to the variation in inclination angle of the main body that the starting of the vehicle would induce.

The constitution according to the present invention that the lamp control angle is updated only when the variation in inclination angle of the main body exceeds the certain specified value during stopping of the vehicle also makes it possible to render the lamp control angle follow only the variation in loading status of the vehicle.

Furthermore, judging a traveling mode of the vehicle out of the signal patterns produced from the front and rear stroke sensors 1 and 2 makes it possible to detect the failure modes in car speed sensor, which can then terminate the lamp control operation.

Simultaneously, the present constitution turns it easier to control the positioning during installation of the sensors for detecting the inclination angle of the main body.

As mentioned above, the technologies according to the present invention have effects that they can not only always adjust the optical beam axis of the head lamp adequately but also turn it easier to adjust the positioning during installation of the sensors for detecting the inclination angle of the main body.

What is claimed is:

1. An optical beam axis adjustment apparatus of a head lamp for use in vehicle, comprising:

stroke sensors for detecting upward and downward movements of a front wheel and a rear wheel;

angular detecting means for detecting an inclination angle of a main body of said vehicle in a back and forth direction in response to sensed signals produced from said stroke sensors and to a distance between two axles of said wheels; and an actuator for varying said optical beam axis of said head lamp upwardly and downwardly corresponding to said detected angular data, wherein:

said optical beam axis is adjusted during stopping of said vehicle, depending upon average angular detection data which are sensed by said stroke sensors and averaged during a certain period prior to said adjustment, wherein:

said optical beam axis is constituted to be readjusted if said inclination angle of said main body varies beyond a certain specified value during said standstill of said vehicle.

2. The apparatus according to claim 1, further comprising:

a traveling sensing unit for sensing a traveling status and a stopping status of said vehicle in response to said sensed signals produced from said stroke sensors.

3. The apparatus according to claim 2, wherein:

said traveling sensing unit is controlled so as to sense said traveling status, corresponding to parameters such as an amplitude, a phase and a frequency of said output signals produced from said stroke sensors connected respectively to said front wheel and said rear wheel.

4. The apparatus according to claim 2, wherein:

a sensing anomaly in car speed signal is constituted to be notified if an applied car speed signal does not coincide with said sensed signal produced from said traveling sensing unit.

5. The apparatus according to claim from 1, further comprising:

memory media for recording adjustment data including said sensed signals produced from said stroke sensors during adjusting said optical beam axis.

* * * * *